Feb. 21, 1961 R. M. HERRICK ET AL 2,972,198
PERFORMANCE BAR
Filed April 29, 1959 2 Sheets-Sheet 1
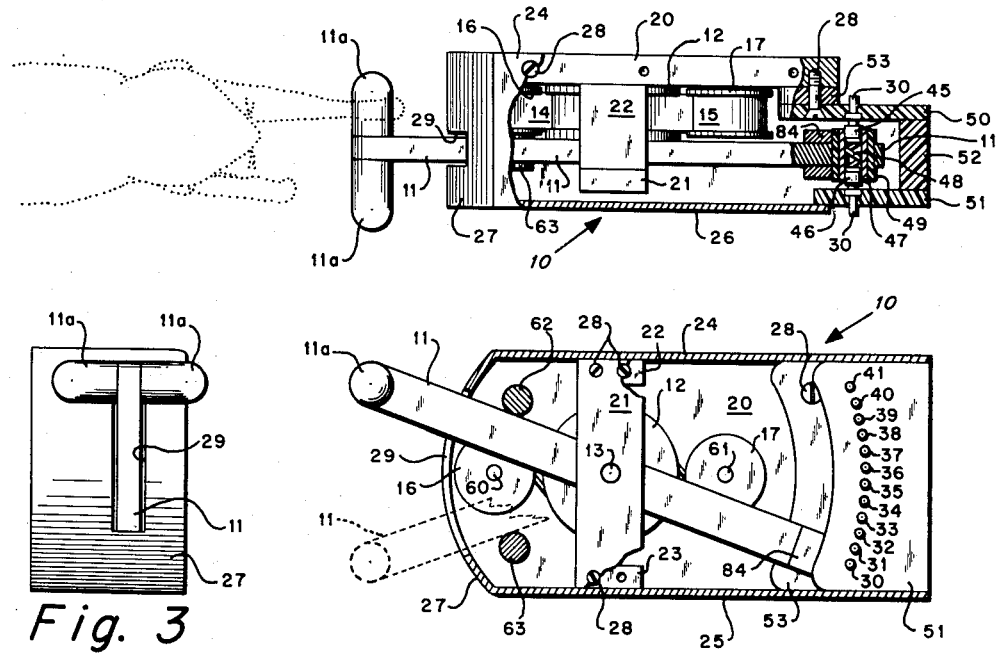
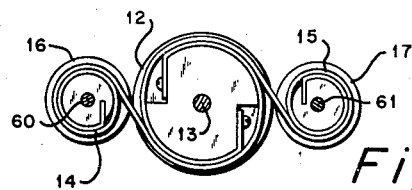
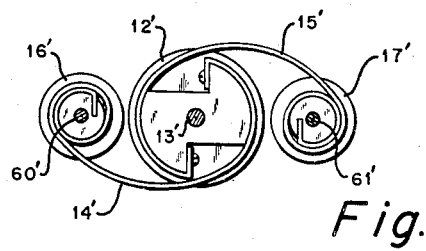
INVENTORS
ROBERT M. HERRICK
PAUL KARNOW
BY
AGENT Feb. 21, 1961     R. M. HERRICK ET AL     2,972,198
PERFORMANCE BAR
Filed April 29, 1959     2 Sheets-Sheet 2
Fig. 7
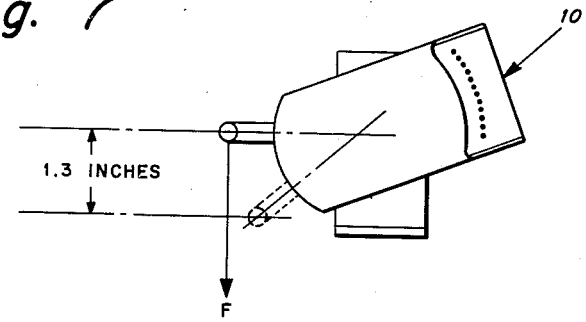
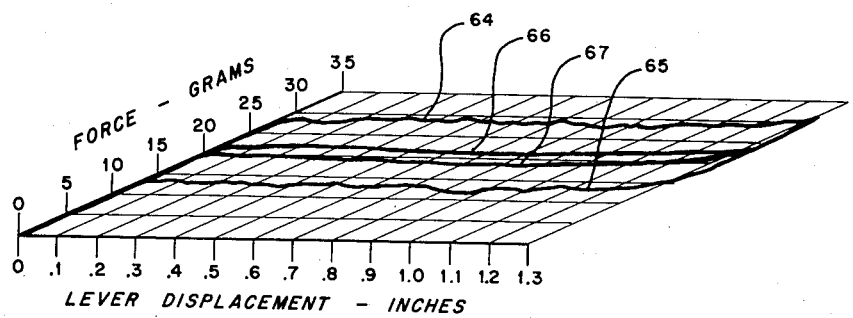
Fig. 6
INVENTORS
ROBERT M. HERRICK
PAUL KARNOW
BY
AGENT

United States Patent Office 2,972,198
Patented Feb. 21, 1961

2,972,198
PERFORMANCE BAR

Robert M. Herrick, Hatboro, and Paul Karnow, Philadelphia, Pa., assignors to the United States of America as represented by the Secretary of the Navy Filed Apr. 29, 1959, Ser. No. 809,890

6 Claims. (Cl. 35—22)

(Granted under Title 35, U.S. Code (1952), sec. 266)

The invention described herein may be manufactured and used by or for the Government of the United States of America for governmental purposes without the payment of any royalties thereon or therefor.

The present invention relates to a device useful in connection with researching problems in experimental psychology, and more particularly relates to a performance bar device.

One of the foremost problems confronting designers of space vehicles is the determination of the motor capabilities of living occupants in a manned space vehicle where the gravitational force of the planet earth may approach zero. At the present time considerable human and material resources are being expended in the search for information which will help solve the problems confronting the designers of space vehicles so that the risk to lives of occupants of the first manned space vehicles may be reduced to a minimum.

More particularly, one of the problems which is sought to be solved is how will a human being react under the influence of substantially zero gravity forces. Aside from the psychological or mental part of the problem, there is the part involving actual physical capabilities of a human being to execute simple physical motor processes or mechanics, such as depressing a simple control lever or bar without the benefit, either direct or indirect, of the gravitational influences. For example, it is axiomatic that for every action there is equal and opposite reaction. Man has become accustomed to exerting a physical motor force with the aid of a reaction surface such as against the floor or ground because of the influence of earth's gravity. The problem then is to discover the extent of the physical motor capabilities of a human being under varying gravity conditions.

It is contemplated that at least part of the answer to the above problem can be obtained by testing the motor capabilities of an animal such as a rat under the influence of varying gravitational conditions.

It is, therefore, a principal object of the invention to provide a mechanical device suitable for aiding in the solution of the problem pointed out hereinabove.

Another object of the invention is the provision of a performance bar device comprising a spring biased lever requiring substantially constant uniform amount of torque for causing the movement thereof in one direction independently of the displacement or position of the lever.

A further object of the invention is the provision of a spring biased lever in which the torque required to operate the lever is constant and independent of the degree of displacement of the lever.

Yet another object of the invention is the provision of a spring-biased performance bar requiring a substantially constant force for displacing the same in one direction and which performance bar is automatically resiliently biased in a reverse direction with a substantially equal, but opposite, uniform force.

A further object of the invention is the provision of a performance bar of the character set forth in the preceding objects provided with means useful in connection with electrical apparatus for indicating or signalling each discrete position of the performance bar, the performance bar being statically and dynamically balanced about a pivot point for neutralizing inertia forces arising in the ends thereof.

A still further object of the invention is the provision of a performance bar for testing the ability of a small animal, such as a rat, to depress the bar a predetermined angular distance under gravitational conditions which may be reduced to zero; the performance bar is a simple lever balanced about a central pivot point and in driving connection with a cylindrical power drum having the ends of a pair of oppositely wound identical spring tapes wound thereon from a pair of separate and oppositely disposed identical takeup drums which have coplanar and parallel turning axes that are equally spaced on either side of the power drum's turning axis.

The invention further resides in certain novel features of construction, combinations and arrangements of parts, and further objects and advantages of the invention will be apparent to those skilled in the art to which it pertains from the following description of the present preferred embodiments thereof, described with reference to the accompanying drawings in which similar reference characters represent corresponding parts throughout the several views, and in which:

Fig. 1 is a top plan view of a device embodying the invention with part of the housing cover broken away and in section to show details of an internal mechanism and construction of the device;

Fig. 2 is an elevational view of Fig. 1, but with a part of the housing broken away to show further details of the internal mechanism;

Fig. 3 is an end elevational view of Fig. 1 for showing details of the performance bar;

Fig. 4 is a sectional detail view of a performance bar unidirectional biasing arrangement;

Fig. 5 is a view similar to Fig. 4, but of a modification of the invention;

Fig. 6 is a graphic illustration of performance bar displacement vs. the amount of force required to displace the performance bar in Figs. 4 and 5;

Fig. 7 is a schematic diagram illustration of the attitude of the test device wherein the performance bar is reposed in a substantially horizontal initial position.

It is to be understood that the invention is not limited to the details of construction and arrangement of parts shown in the drawings and hereinafter described in detail, but is capable of being otherwise embodied and being practiced and carried out in various ways. It is to be further understood that the phraseology or terminology employed herein is for the purpose of description and there is no intention to herein limit the invention beyond the requirements of the prior art.

Referring to Figs. 1–4, the invention is shown embodied in a training or test device, indicated generally by the reference numeral 10.

The device 10 comprises a spring-biased performance bar 11, which is a simple lever, adapted to be operated by a small animal, such as a rat, trained to press the bar 11 down to a predetermined or selected position for the purpose of obtaining food. Each discrete position of the bar is indicated or signalled by electrical means on a display panel, not shown.

The bar 11 is fixed at its midpoint to a power drum 12 by means of a pivotally mounted dowel pin 13. By pressing the bar 11 downwardly, a pair of tape-like springs 14 and 15, respectively coiled about oppositely disposed takeup drums 16 and 17, are wound on the power drum 12. The coils of the springs 14, 15 assume the natural diameter and are unstressed on the drums 16, 17.

More particularly, the pin 13 is journalled by means of conventional antifriction bearings at its ends in a vertical sidewall or mounting plate 20 and a parallel rectangular mounting plate 21. The plate 21 is rigidly connected to the sidewall 20 by means of two parallel, transversely extending, horizontal plates 22 and 23, respectively positioned above and below the power drum 12. A generally U-shaped or horseshoe-shaped sheet metal casing, comprising a pair of parallel upper and lower walls 24 and 25, a perpendicular connecting lateral sidewall 26, and an arcuate interconnecting end wall 27, partially encloses the internal mechanism of the training or test device 10. The walls 24, 25 are secured to the sidewall 20 by conventional means such as screws 28. The end wall 27 is formed with a slot 29 for the passage of one end of the lever 11 therethrough. The lever 11 has a pair of removable lateral dowels 11a which serve as a handle.

One end and one side of the casing are open. The one end of the casing is closed by the sidewall 20 and the one end is enclosed by a nonmetallic structure of a fibreboard construction carrying a series of oppositely disposed pairs of equally spaced electrical terminals 30, 31, 32, 33, 34, 35, 36, 37, 38, 39, 40 and 41.

For example, as the bar 20 is pressed downwardly, the pairs of terminals 30 through 41 are successively bridged and a circuit is completed, for indicating the angular position of the bar 11, by means of an electrically conducting bridge, indicated generally by the reference numeral 45.

The bridge 45 comprises a pair of coaxial cylindrical brushes 46 slidably disposed in an electrical sleeve conductor 47 and biased apart by a light helical spring 48.

The sleeve conductor 47 is insulated from the bar 11, which is preferably of a very light metallic material such as a magnesium or aluminum alloy, by means of an insulating cylinder or bushing 49.

The brushes 46 are adapted to be lightly biased against the electrical commutators or connectors 30 through 41 by the spring 48 so that a good electrical connection therebetween will be assured. The brushes 46 are preferably of polished silver graphite and the commutators 30 through 41 are preferably of polished platinum for reducing friction to a minimum but yet providing good electrical connections.

The contacts 30 through 41 are embedded in and flush with the inner opposed surfaces of a pair of vertical supports 50 and 51 interconnected by a transverse end wall 52. The vertical support 50 is longer than the support 51 and is spaced from the sidewall or support plate 20 by means of a spacer 53. The fibreboard structure comprising the parts 50, 51, and 52 are secured together in a conventional manner, not shown, and the structure and the spacer 53 are secured to the sidewall plate 20 by fastening means, such as the screws 28. The fibreboard material may be replaced with a similar or equivalent electrically insulating material such as Bakelite, if desired.

Referring to Fig. 4, one end of the spring tape 14 is wound approximately three quarters of the way around the power drum 12 and secured with a screw 28. The other end of the spring tape 14 is wound in a reverse direction about the takeup drum 16 and secured in a slot. Likewise the spring tape 15 is reversely wound around and secured to the power drum 12 and the takeup drum 17. The turning axis of each of the drums 15, 16, 17 lie in a common horizontal plane and are symmetrically arranged. In order to reduce friction, the takeup drums 16, 17 are supported on cantilever shafts 60, 61 which are each journalled at one end in the sidewall plate 20 by means of conventional antifriction bearings. The diameters of the takeup drums 16, 17 are the same as the diameter of the natural coiling diameters of the tapes 14, 15.

As the bar 11 is biased downwardly, preferably through a 40 degree arc determined by an upper cylindrical stop 62 fixed in the plate 20 and a similar, but adjustable, lower stop 63, Fig. 2, the tapes 14, 15 are wound onto the power drum 12 and unwound from the takeup drums 16, 17, respectively. The reverse winding of the tapes in Figs. 1–4 increases the amount of power required to depress the bar 11. If the tapes 14, 15 were wound as shown in Fig. 5, the amount of power required to depress the bar 11 would be less. Consequently, for substantially the same torque requirement, smaller springs are required if reversely wound onto the takeup drums 16, 17. More particularly, the reversely wound take-up arrangement of Fig. 5 comprises a power drum 12' mounted on a pin 13', tape-like springs 14' and 15, and take-up drums 16' and 17' mounted on shafts 60' and 61', respectively. The springs 14', 15' have ends inserted in slots in take-up drums 16', 17', respectively, and then are given one and a half turns over the drums 16', 17'. Springs 14, 15 are reposed in a half turn over the power drum 12' when the handle 11 is in a position shown in Fig. 2. The ends of the springs 14', 15' are fastened parallel and substantially diametrically opposite to each other in slots on the drum 12'.

One of the unique features of the performance bar device 10 is that the amount of force or torque required to depress the bar 11 is constant regardless of the displacement thereof due to the unique construction of the internal mechanism wherein every practical step has been taken to reduce weight and friction, and to statically and dynamically balance the bar 11. For example, brass counterweights 84, Fig. 1, are used to balance the bar 11 about its pivot axis.

Also important is that the springs 14, 15 not only provide uniform resistance to the depression of the bar 11, but also return the bar 11 to its uppermost position with a uniform biasing force or torque, as illustrated in Fig. 6. Fig. 7 shows the attitude of the test device 10 embodying the biasing arrangements of Figs. 4 and 5, wherein the uppermost position of the bar 11 is horizontal or normal to the direction of a tangential depressing force F.

Referring to Fig. 6, which shows representative results of the tested embodiments of Figs. 4 and 5, it is apparent that the torque required to depress the lever 11 is substantially constant. The variations are due to roughness, imperfections, or dirt in the antifriction bearings, spring tapes, commutators, and commutator brushes.

In Fig. 6, the force required to depress the lever 11 through a vertical tangential distance of 1.3 inches is substantially constant with the relative increase in torque force being due to the fact that the force is tangential and not angular so that some of the force vector F has a radial component greater than zero. When the force vector has a perfect tangential and angular force vector component with no appreciable radial force vector component, the torque is relatively constant.

More particularly, in Fig. 6 the amount of force required to depress the lever 11 is approximately 26 grams, as seen from line 64, and the force biasing the lever 11 upwardly is 13 grams, as seen from line 65, with a maximum variation of approximately ±2 grams.

With the brushes 46 removed, the amount of force required to depress and raise the lever 11 varies only about two or three grams, as seen from lines 66 and 67. The downward stroke force is approximately 22 grams, line 66, and the return force is approximately 20 grams, line 67. Without the friction of the brushes 46, the force required to depress and raise the lever 11 is more uniform as is apparent from graph lines 66 and 67. Also note the peculiar influence the spring-biased brushes 46 have upon the lines 64 and 65. The friction of the brushes 46 on the downward stroke is approximately +6 grams and on the return stroke is approximately −6 grams. The roughness of lines 66 and 67 is largely due to dirt or other foreign matter in the precision made antifriction bearings.

While two specific embodiments made in accordance with the invention have been shown and described, it is understood that the invention is susceptible of many changes and modifications, as known to a person skilled in the art, and it is intended to cover all such changes and modifications coming within the scope of the appended claims.

What is claimed is:

1. In a device especially adapted for use in experimental psychology, support means, lever means connected to said support means, and constant torque spring means biasing said lever means in one direction independent of the relative position of said lever means and the amount of the earth's gravitational forces acting on the device.

2. In a device especially adapted for use in experimental psychology, support means, lever means connected to said support means, constant torque spring means biasing said lever means in one direction independent of the relative position of said lever means and independent of the amount of the earth's gravitational forces acting on the device, and spaced electrical terminal means for sensing the relative angular position of said lever means.

3. In a device especially adapted for use in experimental psychology, support means, power drum means and takeup drum means journalled in said support means, tape-like spring means connecting said takeup drum means and resiliently biasing said power drum means in one direction with a substantially constant torque independent of the relative angular position of said power drum and independent of the amount of the earth's gravitational forces acting on the device, and lever means fixed to said power drum means.

4. In a device especially adapted for use in experimental psychology, support means, power drum means and takeup drum means journalled in said support means, tape-like spring means connecting said takeup drum means with said power drum means and resiliently biasing said power drum means in one direction with a substantially constant torque independent of the relative angular position of said power drum means and independent of the amount of the earth's gravitational forces acting on the device, lever means fixed to said power drum means, electrical commutator brush means mounted in one end of said lever means, and electrical commutator contact means carried by said support means and adapted to be sequentially engaged by said electrical commutator brush means as said lever is angularly displaced for use in determining the instantaneous position of said lever means as the latter is displaced.

5. In a device as set forth in claim 4, wherein said lever means are statically balanced about the pivot point thereof.

6. In the device of claim 1; said spring means comprising a plurality of tape-like springs.

References Cited in the file of this patent

UNITED STATES PATENTS

| | | |
|---|---|---|
| 1,067,972 | Comstock | July 22, 1913 |
| 1,977,546 | Fornelius | Oct. 16, 1934 |
| 2,609,193 | Foster | Sept. 2, 1952 |

FOREIGN PATENTS

| | | |
|---|---|---|
| 325,889 | Germany | Sept. 18, 1920 |